April 21, 1931.  R. H. MUELLER  1,801,363
RING FOR CHAINS ON TRAPS AND METHOD OF MAKING THE SAME
Filed Oct. 17, 1925
Fig. 1.
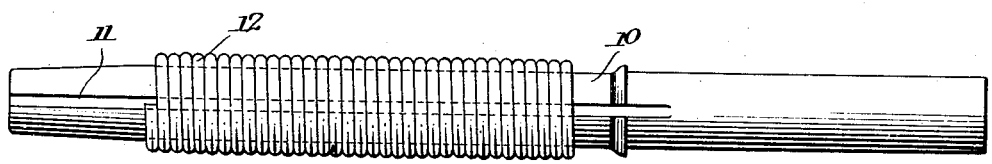
Fig. 2.
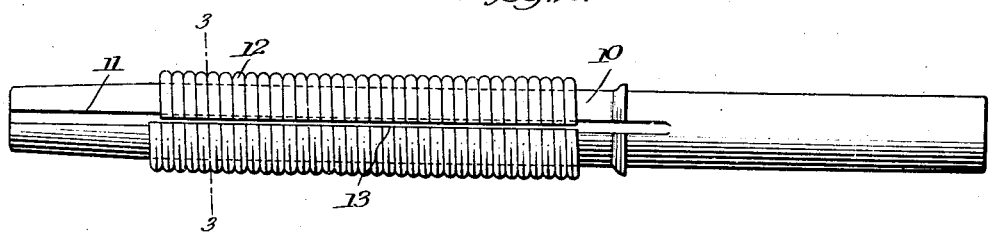
Fig. 3.
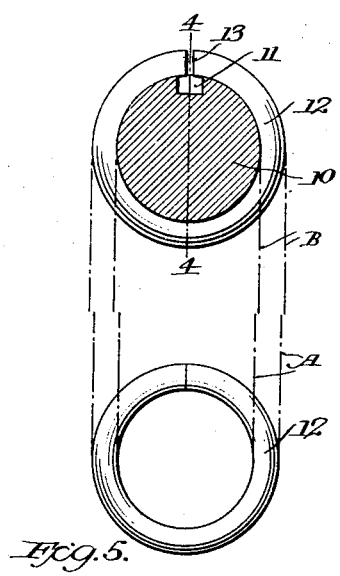
Fig. 4.
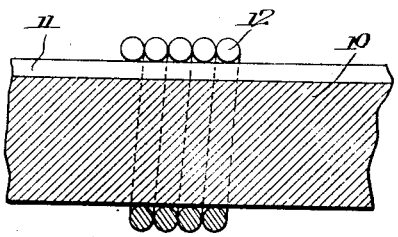
Fig. 5.
Fig. 6.
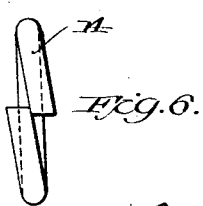
Inventor
Robert H. Mueller,
By Cushman Bryant Darby
Attorneys Patented Apr. 21, 1931

1,801,363

UNITED STATES PATENT OFFICE

ROBERT H. MUELLER, OF DECATUR, ILLINOIS, ASSIGNOR, BY MESNE ASSIGNMENTS, TO MUELLER CO., OF DECATUR, ILLINOIS, A CORPORATION OF ILLINOIS

RING FOR CHAINS ON TRAPS AND METHOD OF MAKING THE SAME

Application filed October 17, 1925. Serial No. 63,193.

This invention relates to rings used for connecting plug carrying chains to plugs and to wash basins, tubs and the like, and to the method of making the same.

An important object of the invention is to provide a method of making split rings of this description, whereby the ends thereof are securely held together to prevent the chain from becoming detached from the ring, or the ring from a bath fitting.

Another important object of the invention is to provide a method in which rings, tubular members or the like are placed under tension during their manufacture to impart certain characteristics thereto found highly necessary and beneficial to the art.

Other objects and advantages of the invention will become apparent during the course of the following description.

In the drawings wherein like numerals are employed to designate like parts throughout the several views:

Figure 1 is a side elevation of a coil of material upon a mandrel illustrating the first step in the method of making the rings.

Figure 2 is a similar view showing the coil after being expanded and then cut to form independent rings.

Figure 3 is an enlarged transverse section taken on the line 3—3 of Figure 2.

Figure 4 is a longitudinal section of the same taken on the line 4—4 of Figure 3.

Figure 5 is an elevation of the coiled material prior to expansion thereof; and

Figure 6 is a side elevation of one of the rings after removal from the mandrel.

Heretofore great annoyance and inconvenience has been caused by the chains of plugs for wash basins, tubs, and the like becoming detached from the rings which suspend the chain, or from the fact that the rings sometimes become detached from the bath fittings. This annoyance is due to the fact that the ends of the split rings now used for this purpose become separated while in use, thereby permitting the detachment of the chains from the rings, or the rings from their fittings.

The present invention eliminates this annoyance or difficulty by providing a ring, the ends of which are securely held together, due to the qualities imparted to the rings during their manufacture.

Referring now more particularly to the drawings, the numeral 10 designates a mandrel or core which is tapered as shown. This mandrel is provided with a longitudinally extending groove 11 for a purpose which will be apparent during the explanation of the method of making the rings.

A coil of any resilient material or wire, such as bronze wire 12, is wound or coiled in spiral formation with the convolutions thereof in contact as shown in Figure 1. This wire coil or helix may thus be formed by being wound upon a mandrel, or it may be formed in any other suitable manner.

After the wire has been formed into an elongated spiral coil as above described, the tapered mandrel is inserted longitudinally into the coil and formed therein in order to expand the convolutions thereof and to place the coil under tension. In this connection, attention is invited to Figures 3 and 5, the dotted lines A on the latter showing the diameter of the coil before the same has been expanded, while the dotted lines B in Figure 3 show the increased diameter of the coil after the same has been expanded.

After this step in the method has been carried out, the expanded coil of wire is cut longitudinally of the mandrel and transversely of the expanding movement of the convolutions by any suitable means such as a milling tool which is arranged to cut through the coil of wire opposite the groove 11 in the mandrel as clearly shown in Figure 3; the cut through the coil of wire being indicated by the numeral 13. The milling tool employed has its width proportioned in accordance with the tension under which the coil is placed, so that when the individual spires, or rings are removed from the mandrel, the ends of the spire will spring together in slight overlapping relation. This groove in the mandrel is obviously provided to permit the milling tool to cut entirely through the coil without damaging the mandrel. By cutting the coil longitudinally with a milling cutter it will be appreciated that there will be practically no burrs left on the ends of the individual rings or spires so that these ends will be finished off in the milling operation and will meet practically flush when the ring is finished to form a true annuli.

The next step in the method consists of removing from the mandrel, the independent rings or spires formed from the coil of wire by cutting the same longitudinally with the milling tool while the wire is expanded. When these individual rings are slipped off of the mandrel, their ends immediately spring together in overlapping relationship as shown in Figure 6, due to the fact that these rings have been expanded prior to the cutting operation. With the rings in this condition, the chains for suspending the plugs can be readily associated therewith by threading the end link of the chain onto an end of each ring. Thereafter, the ends of each ring are forced into alignment to form a true circle or perfect ring, and if desired a suitable tool may be employed to take the strain out of the ring.

I am aware of previous methods of making these rings by placing the spiral coil of wire upon the mandrel and cutting the coil longitudinally to form the independent rings, but the new step in my method of making these rings, consists of tensioning or springing the convolutions of the coil of material either prior to or after the cutting operation.

The terms "tension" and "tensioning" employed herein are to be construed in their broadest sense and are not to be confined to covering only an expansion of the material, but also as covering and including a contraction of the material as well.

From the foregoing description it will be noted that after the individual rings or spires 14 are removed from the mandrel and subsequently expanded to draw their ends apart and twisted to cause the ends to register or align to form a true circle, some of the tension imparted to the rings by expansion of the coil by means of the mandrel will have been removed so that it may be said that at least some of the original tension imparted to the coil of wire and incidentally the subsequently formed individual rings, is removed by the subsequent expansion and twisting of the rings. Consequently, it will be observed that the entire original tension imparted to the coil of material is temporary; as all of the original tension is removed by subsequent operations, except a small portion just sufficient to cause the two ends of the individual rings to come together in abutting relation under the influence of a slight tension left in the ring after the twisting operation to cause its ends to register or align. In some instances, it may be desirable to relieve all of the tension in the ring so that the ends will just barely meet when placed in registration, or on the other hand it may be desirable to leave sufficient tension in the rings to cause their ends to move toward each other into firm abutting relation by the inherent tension left in the rings. I consider my invention as covering any of these variations.

I claim:

1. The method of forming spires consisting of temporarily springing a helix and then cutting through said helix radially.

2. The method of forming spires consisting of temporarily expanding a helix, and subsequently cutting through said helix substantially longitudinally of its axis.

3. The method of forming rings and the like consisting of placing a helix upon a core, expanding the helix, and then cutting through the helix longitudinally of the core.

4. The method of forming rings and the like consisting of placing a coil upon a core, expanding the coil by relative movement of the core and coil, and then cutting the coil longitudinally of the core.

5. The method of forming rings or the like consisting of placing coil upon a tapered core, expanding the coil by relative movement of the core and coil, and subsequently cutting the coil longitudinally of the core.

6. The method of forming rings or the like consisting of springing a coil of resilient material and subsequently through said coil substantially longitudinally of its axis.

7. The method of forming rings or the like consisting of increasing the diameter of a coil of resilient material by expanding the same, and subsequently cutting said coil longitudinally of its axis.

8. The method of forming rings or the like consisting of placing a coil of resilient material upon a core, expanding said coil, and subsequently cutting the coil longitudinally of its axis.

9. The method of forming rings or the like consisting of forcing a tapered mandrel into a coil of resilient material to expand the same, and subsequently cutting said expanded coil longitudinally.

10. The method of forming rings or the like consisting of expanding a coil of resilient material and subsequently cutting said coil substantially longitudinally thereof to form a plurality of split rings having overlapping ends.

11. The method of forming rings consisting of expanding a coil of resilient material, cutting said coil longitudinally to form a plurality of individual split rings having overlapping ends and subsequently treating said rings to cause their ends to remain in alignment.

12. The method of forming rings consisting of expanding a coil of resilient material, cutting the same longitudinally to form a plurality of split rings having overlapping ends, positioning the ends of each ring in alignment, and subsequently relieving the rings of strain.

13. A split resilient ring having its ends normally urged together by qualities imparted thereto by splitting the ring transversely while it is subjected to temporary expansion.

14. An article of manufacture comprising a split resilient ring having its ends normally urged together by qualities imparted thereto by cutting the ring transversely while temporarily expanded.

15. The method of the character described consisting of temporarily springing a tubular member and then cutting the same while subjected to such tension.

16. The method of forming annuli and the like consisting of temporarily tensioning a coil of material and then cutting the coil substantially radially.

17. The method of forming annuli and the like consisting of placing a coil of resilient material under tension and cutting said coil substantially longitudinally to divide the same into annuli.

18. An article of manufacture comprising a resilient ring tensioned and split to cause its ends to close together, after being split, by the tension stored in the ring.

19. An article of manufacture comprising a resilient ring split while sprung to cause its ends to overlap, after which the spire is stressed to align the ends thereof.

20. The method of forming rings or the like consisting of temporarily springing a coil of resilient material, and cutting said coil longitudinally while it is retained in sprung condition.

21. The method of forming rings or the like consisting of temporarily springing a coil of resilient material, cutting said coil longitudinally while it is retained in sprung condition to form a plurality of individual split rings, and relieving said rings of some of said tension in causing the ends of said rings to remain in alignment.

In testimony whereof I have hereunto set my hand.

ROBERT H. MUELLER.